Feb. 19, 1957   W. WOODS-HILL   2,782,304
ELECTRICAL IMPULSE GENERATORS
Filed Jan. 13, 1953
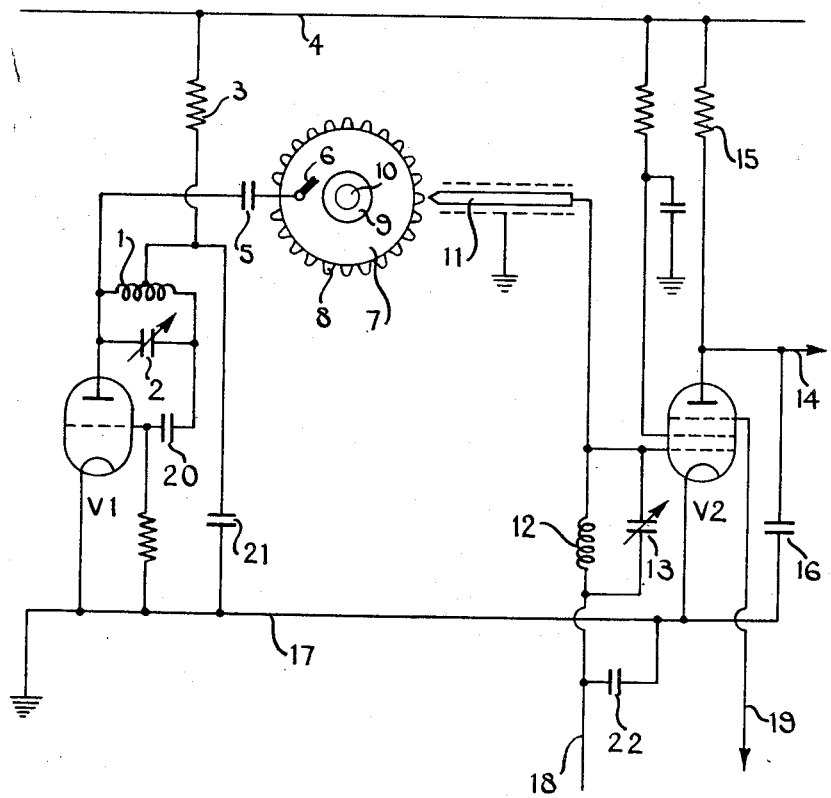
Inventor
WILLIAM WOODSHILL
By Frederick E. Hary
   Attorney

2,782,304
Patented Feb. 19, 1957

2,782,304

ELECTRICAL IMPULSE GENERATORS

William Woods-Hill, Letchworth, England, assignor to The British Tabulating Machine Company Limited, London, England Application January 13, 1953, Serial No. 331,058

Claims priority, application Great Britain February 13, 1952

6 Claims. (Cl. 250—27)

This invention relates to a method of, and apparatus for, generating electrical impulses.

It is well known to generate pulses of uniform or non-uniform spacing and duration by means of a commutator drum having alternate conducting and non-conducting segments. Connection is made to the conducting segments by one or more contact brushes. Since the brush breaks current each time it passes from a conducting segment to a non-conducting segment considerable difficulty is often experienced with pitting of the segments due to arcing. If the commutator drum is rotated at high speed the output pulses may become irregular due to uneven contact of the brush with the segments.

The object of the present invention is to provide a method of generating impulses in which arcing is eliminated.

According to the invention the method of generating electrical impulses comprises capacitatively coupling a source of electrical oscillations to a detecting device and varying the coupling capacity mechanically in a predetermined manner, the duration of one cycle of the oscillations being not less than the minimum time between any two successive pulses.

The invention will now be described by way of example with reference to the accompanying drawing which shows a circuit diagram of the impulse generator.

A valve V1 is connected as an oscillator to provide a source of continuous oscillations. The frequency determining circuit comprises a coil 1 and capacitor 2 connected directly to the anode of the valve V1 and connected to the control grid through a capacitor 20. A positive H. T. supply line 4 is connected through a resistor 3 to a centre tap on the coil 1 which is by-passed to a ground line 17 by a capacitor 21.

The output from the anode of the oscillator valve V1 is connected to a contact brush 6 through a capacitor 5. This brush contacts a metallic disc 7 which is secured concentrically on a shaft 10 by an insulating ring 9. The disc 7 has a number of teeth 8 around the periphery, in the manner of a gear wheel. The shaft 10 is rotated at constant speed by a suitable driving motor (not shown).

A probe 11 is mounted with one end close to the periphery of the disc 7 but so as not to touch the ends of the teeth 8 as the disc 7 is rotated. The cross section of this end of the probe is preferably the same as the cross section of the end of a tooth 8, or slightly smaller.

The disc 7 and the probe 11 form the two plates of a capacitor and the capacity varies from a maximum when a tooth is opposite the probe to a minimum when a gap between teeth is opposite the probe.

If the space between teeth is of the same order as the width of the teeth, the change of capacity will not be proportional to the change in air gap corresponding to the top of a tooth and the gap between teeth. It is possible, however, to obtain a change of 20:1 without difficulty. For example, this ratio was obtained with a disc thickness of .25 inch, a tooth height of .0625 inch, and a spacing of .125 inch between the centres of adjacent teeth. The end of the probe had the same cross-section as the end of a tooth and the clearance between a tooth and the probe was approximately .005 inch.

As the capacity between the disc and the probe varies, the oscillatory voltage picked up by the probe will vary correspondingly. Thus the number of maxima occurring per second will be proportional to the number of teeth on the wheel and the speed of rotation of the shaft 10. To ensure that the maximum probe voltage is the same for each tooth, at least one cycle of the oscillatory voltage must occur in the time taken for one tooth and one gap to move past the probe. This sets a lower limit to the frequency of the oscillatory voltage in any particular case. When the teeth are spaced at different intervals, in order to produce a pattern of impulses with non-uniform spacing, the lower frequency limit is set by the minimum spacing between any two adjacent teeth.

In practice, it is convenient to use a frequency considerably greater than the lower limit so that several cycles occur as each tooth passes the probe. For example, with a disc having 100 teeth and rotating at 3000 revolutions per minute, the probe voltage varied at a rate of 5000 times per second and the frequency of the source was made approximately 1 megacycle per second. Since the voltage picked up by the probe is due to capacitative coupling it is independent of the rate of change of the capacity and the voltage has substantially the same amplitude at 1 revolution per second as at 3000 revolutions per minute.

The probe is connected directly to the control grid of a pentode V2. The control grid is connected to a negative bias line 18 through a parallel tuned circuit comprising a coil 12 and a capacitor 13. The bias line is by-passed to the line 17 by a capacitor 22. The cathode of the valve is also connected to line 17 so that the control grid to cathode inter-electrode capacity is in parallel with the capacitor 13. By adjusting the tuned circuit to resonance at the source frequency a high impedance load is presented to the probe.

The anode of the pentode V2 is connected to the H. T. line 4 through a resistance 15 and to line 17 by a capacitor 16 which has a low impedance at the source frequency and a relatively high impedance at the impulse frequency. The voltage of line 18 is such that the valve is non-conducting when the probe voltage is a minimum, and is driven fully into conduction when the probe voltage is a maximum. The anode voltage of valve V2 falls when it conducts so that the potential of a line 14 connected to the anode drops correspondingly. If a device to be operated by the pulses is capacitatively coupled to line 14, it will receive a negative pulse each time a tooth passes the probe. The capacitor 16 removes the oscillatory component of the pulses, so that the valve V2 acts effectively as a combined rectifier and amplifier. With 50 volts output from the oscillator the pulse output on line 14 was approximately 110 volts.

The supressor grid of valve 12 is connected to a line 19 which is held at the potential of line 17 for normal operation. By connecting line 19 to any convenient form of switching device which will place the line either at earth potential or at a large negative potential the output on line 14 may be switched on and off as required.

Several outputs may be obtained from a single oscillator by providing a corresponding number of discs, or a drum with several rows of teeth, connected in common to the oscillator, a separate probe and detecting device co-operating with each set of teeth. By mounting two or more probes in line with one row of teeth but angularly displaced from one another, identical pulse trains are produced having relative phase displacements corresponding to the location of the probes.

It will be appreciated that any desired pattern of pulses may be produced by having a corresponding pattern of teeth on the disc or drum. In the disc shown one of the teeth is removed to provide a gap in the pulse pattern to indicate when a complete revolution of the disc has taken place.

It is more convenient to use a non-conducting disc or drum with a conducting pattern deposited on the surface when the required pulse pattern is complex. The pattern may be deposited by any of the known techniques used in the manufacture of the so-called "printed" circuits. By depositing patterns on thin flexible non-conducting sheets any one of which may be attached to the surface of the drum by suitable clips it is possible to provide a great variety of pulse patterns with the minimum cost and quantity of equipment.

The brush 6 is permanently in contact with the disc 7 so that there is little danger of arcing or pitting. If the disc is being rotated at high speed so that there is appreciable wear of the brush, the oscillator may be coupled inductively to the disc. A coil is wound on the insulating ring 9, and shunted by a capacitor to form a circuit resonant at the oscillator frequency. One end of the coil is connected to the disc 7 or to the conducting pattern in the case of a non-conducting drum. The other end of the coil is connected to the shaft 10 which may be earthed.

The brush 6 is disconnected and the oscillator output is connected to a coupling coil wound on a former fixed concentrically with the ring 10, but not touching it. The mutual inductance between the coils provides the necessary coupling between the oscillator and the disc.

What I claim is:

1. An electrical impulse generator comprising, in combination, a radio frequency signal generator, a radio frequency amplifier and rectifier for amplifying and rectifying radio frequency signals produced by said radio frequency signal generator, said radio frequency amplifier and rectifier having an input circuit and an output circuit, a capacity coupler coupling said radio frequency signal generator to the input circuit of said radio frequency amplifier and rectifier, means for mechanically varying the coupling of said capacity coupler between first and second coupling levels in accordance with a predetermined pattern to feed corresponding radio frequency signals of either a first or a second amplitude level to the input circuit of said radio frequency amplifier and rectifier, means for rendering said radio frequency amplifier and rectifier solely responsive to radio frequency signals of said first amplitude level and nonresponsive to radio frequency signals of said second amplitude level, said radio frequency amplifier and rectifier amplifying and rectifying said radio frequency signals of said first amplitude to produce at the output circuit a series of electrical impulses corresponding to said predetermined pattern of occurrences of said first level of coupling.

2. Apparatus as claimed in claim 1, wherein said radio frequency amplifier and rectifier comprises a valve which is biased to be fully conducting for radio frequency signals of said first amplitude level and non-conducting for radio frequency signals of said second amplitude level so that the amplitude of the electrical impulses at the output circuit of said radio frequency amplifier and rectifier is substantially constant and independent of small variations in the amplitude of the radio frequency signal fed from said capacity coupler when at said first level of coupling.

3. Apparatus according to claim 2, wherein said valve includes an element for modifying the pattern of electrical impulses at the output circuit of said radio frequency amplifier and rectifier.

4. Apparatus as claimed in claim 1, wherein the input circuit of said radio frequency amplifier and rectifier includes a capacitor and inductor connected in a circuit adjusted to resonate at the frequency of said radio frequency signal generator to provide a relatively high impedance load for said capacity coupler.

5. Apparatus as claimed in claim 1, wherein said capacity coupler comprises a rotatable shaft, a disc secured on said rotatable shaft, a pattern of conducting portions on a surface of said disc and a probe positioned adjacent to said disc to scan said conducting portions when said disc is rotated.

6. Apparatus according to claim 4, wherein said disc is of insulation material and said pattern of conducting portions is on a flexible sheet attached to said disc.

References Cited in the file of this patent

UNITED STATES PATENTS

| | | |
|---|---|---|
| 1,893,019 | Culver | Jan. 3, 1933 |
| 2,223,513 | Fransson | Dec. 3, 1940 |
| 2,281,495 | Hammond | Apr. 28, 1942 |
| 2,309,068 | Hermansson | Jan. 19, 1943 |
| 2,388,233 | Whitaker | Oct. 30, 1945 |
| 2,439,255 | Longfellow | Apr. 6, 1948 |
| 2,477,585 | Dodington | Aug. 2, 1949 |